United States Patent Office 3,684,669
Patented Aug. 15, 1972

3,684,669
ELECTROCHEMICAL REDUCTION OF
AROMATIC COMPOUNDS
Joseph S. Matthews, O'Hara Township, Allegheny County, Pa., assignor to Gulf Research & Development Company, Pittsburgh, Pa.
No Drawing. Filed May 6, 1971, Ser. No. 141,016
Int. Cl. C07b 29/06; C07c 5/10
U.S. Cl. 204—73 R                11 Claims

ABSTRACT OF THE DISCLOSURE

A process for electrochemically reducing aromatic compounds in the presence of an aqueous system containing an amine, an ammonium salt or an inorganic acid and a catalyst, such as $BF_3$.

---

This invention relates to a process for electrochemically reducing aromatic compounds, particularly for electrochemically reducing benzene to 1,4-cyclohexadiene. The mixture being subjected to electrochemical reduction herein, by passing a direct current of electricity therethrough, is a homogeneous aqueous mixture containing in aromatic compound, an amine, an ammonium salt or an inorganic acid and a catalyst. In my copending application Ser. No. 141,017, filed concurrently herewith, I have disclosed and claimed a process for electrochemically reducing an aromatic compound which involves passing a direct current of electricity through a substantially anhydrous homogeneous mixture containing an aromatic compound, an amine, an ammonium salt or an inorganic acid and a catalyst. I have now found that by passing a direct current through an aqueous system containing the same components there is obtained an increase in current efficiency and selectivity to desired compound.

The aromatic compound can be napththalene, alkyl-substituted naphthalenes, benzene or alkyl-substituted benzenes carrying one or two alkyl substituents thereon wherein the alkyl substituents, the same or different, can have from one to four carbon atoms, but preferably is methyl. Examples of such aromatic compounds are napthalene, alpha-methylnaphthalene, beta-ethylnaphthalene, benzene, toluene, o-, m- or p-xylene, etc. The benzenes are converted principally to 1,4-cyclohexadienes, while naphthalene is reduced principally to 1,4-dihydronaphthalene and eventually to 1,4,5,8-tetrahydronaphthalene.

The amine, which is employed herein as a solvent, can include any amine in which the aromatic compound being reduced is soluble, and can be defined by the following structural formula:

wherein R' can be either hydrogen or an alkyl group having from one to eight carbon atoms, preferably from one to four carbon atoms, and R" can be an alkyl group as defined by R'. Specific examples of amines that can be used are methylamine, ethylamine, butylamine, diethylamine, dibutylamine, etc.

As catalyst any electron deficient compound which is soluble in the amine solvent defined above and which is not inactivated by said solvent can be used. Specific examples of catalysts that can be used are boron trifluoride, aluminum bromide, tetracyanoethylene, etc.

In addition to the above there is also present in the system an inorganic acid soluble in the reaction mixture having an ionization constant above about $1 \times 10^{-5}$, preferably in the range of about $1 \times 10^{-4}$ to about $1 \times 10^{-1}$, or an ammonium salt of said inorganic acid soluble in said mixture. Specific examples of inorganic acids or ammonium salts that can be used are hydrogen chloride, ammonium chloride, ammonium nitrate, ammonium bromide, etc.

The amounts of each of the components of the reaction mixture can be varied over a relatively wide range. Thus, based on the total mixture being subjected to reduction herein, the aromatic compound can be present in an amount ranging from about 0.1 to about 50, preferably from about one to about 10 mol percent; the amine from about 40 to about 90, preferably from about 50 to about 70 mol percent; the catalyst from about 0.01 to about two, preferably from about 0.1 to about one mol percent; the inorganic acid or ammonium salt from about one to about 10, preferably from about three to about six mol percent; and water from about one to about 60, preferably from about three to about 50 mol percent.

The pressure and temperature of the mixture during the reaction are not critical. Pressure has no apparent effect on the reaction and, therefore, atmospheric pressure is preferred. Temperatures can be in the range of about 0 to about 50° C., but a temperature in the order of about 10° to about 30° C. is preferred. Time is not critical and is dependent upon the amount of reduction desired.

The amount of current required for electrolysis can also vary over a wide range. Thus, the amount of current supplied to the reaction system can vary from about 0.01 to about 0.3 ampere per square centimeter of cathode surface area, preferably within the range of about 0.05 to 0.2 ampere per square centimeter of cathode surface area. The electrodes employed are carbon electrodes, perferably graphite.

The reaction is simply effected. The reaction mixture defined above is placed in a cell or vessel containing a carbon anode and a carbon cathode and merely involves passing a direct current of electricity therethrough over a designated period of time. If desired, a divided cell can be used, for example, one contained a fritted glass disc divider. This is not preferred, however, because there is a tendency to clog up the cell divider, current efficiency is reduced, electrical resistance increases, more heat is generated, etc. The resultant mixture can then be subjected to simple distillation procedures to recover the desired reduced product.

In order to exemplify the above a number of runs were made in an undivided cell containing spectroscopic grade graphite rods, each of which had a diameter of six millimeters and a cathode surface area immersed in the reaction of eight square centimeters. The solution during electrolysis was stirred magnetically while it was cooled externally by a water bath. During the runs the temperature was maintained at about room temperature, ±5° C. Current was supplied by a Technipower Model L 160-3M power supply, wherein the voltage (0–160 v.) or current (0–3 A.) could be regulated. Analysis was made by gas chromatography where possible and peaks, not otherwise identifiable, were identified by mass-gas liquid chromatography or infra-red gas liquid chromatography. The results obtained are set forth below in Table I.

TABLE I

| Run No. | Solvent | Ml. | Salt | Grams | Molar concentration of— Salt | BF₃ | Benzene | Amps | Volts | Amp-hours | Mol percent benzene converted | Overall current efficiency | Current efficiency to— 1,4-cyclo-hexadiene | Cyclo-hexene | Mol percent selectivity to 1,4-cyclo-hexadiene |
|---|---|---|---|---|---|---|---|---|---|---|---|---|---|---|---|
| 1 | H₂O / EDA | 1.0 / 50 | NH₄Cl | 1.7 | 0.64 | 0.32 | 0.113 | 0.75 | 50 | 2.25 | 12.9 | 43.3 | 32.6 | 10.7 | 75.2 |
| 2 | H₂O / EDA | 1.0 / 50 | NH₄Cl | 1.7 | 0.64 | 0.32 | 0.113 | 0.40 | 40 | 2.40 | 21.8 | 57.5 | 44.9 | 12.6 | 78.0 |
| 3 | H₂O / EDA | 0.45 / 50 | NH₄Cl | 1.3 | 0.50 | 0.32 | 0.113 | 0.50 | 38 | 2.00 | 10.9 | 40.0 | 31.6 | 8.4 | 79.0 |
| 4 | H₂O / EDA | 1.8 / 50 | NH₄Cl | 2.1 | 0.80 | 0.32 | 0.113 | 0.50 | 30 | 2.00 | 11.5 | 41.2 | 31.8 | 9.4 | 82.0 |
| 5 | H₂O / EDA | 10 / 40 | NH₄Cl | 2.1 | 0.80 | 0.32 | 0.113 | 0.50 | 30 | 2.00 | 24.7 | 80.9 | 74.2 | 6.7 | 91.7 |
| 6 | H₂O / EDA | 25 / 25 | NH₄Cl | 2.1 | 0.80 | 0.32 | 0.113 | 0.50 | 14 | 2.00 | | | | | |

NOTE.—EDA=Ethylenediamine.

The data in the above table illustrate the advantages of operating in accordance with the process described and claimed herein. Current efficiency referred to in the table can be defined by the following:

$$\frac{M(D+2T) \times 5360}{A}$$

wherein M equals the mols of aromatic charge, D equals percent dihydro product according to gas chromatography and T equals percent tetrahydro product according to gas chromatography, and A equals ampere hours used. In comparing the above data with the data in the copending application referred to hereinabove, it is apparent that by carrying out the defined reaction in an aqueous medium current efficiency is improved and selectivity to desired product is increased. For example, as can be seen from Run No. 5, the presence of an optimum amount of water in the system results in over-all current efficiency as high as about 80 percent and selectivity to desired compound in excess of 90 percent. The use of too much water in Run No. 6, however, resulted in no conversion to desired product.

Obviously, many modifications and variations of the invention, as hereinabove set forth, can be made without departing from the spirit and scope thereof, and therefore only such limitations should be imposed as are indicated in the appended claims.

I claim:
1. A process for electrochemically reducing an aromatic compound selected from the group consisting of naphthalene, alkylnaphthalenes, benzene and alkyl benzenes carrying from one to two alkyl substituents on the ring in a vessel containing a carbon anode and a carbon cathode which comprises passing a direct current of electricity through a homogeneous aqueous mixture containing said aromatic compound, an aliphatic amine, having 1-8 carbons in a chain, an electron deficient compound soluble in said amine as catalyst and an inorganic compound selected from the group consisting of an inorganic acid having an ionization constant above about $1 \times 10^{-5}$ and the ammonium salt thereof.

2. The process of claim 1 wherein said aromatic compound is benzene.
3. The process of claim 1 wherein said amine is ethylenediamine.
4. The process of claim 1 wherein said ammonium salt is NH₄Cl.
5. The process of claim 1 wherein said catalyst is BF₃.
6. The process of claim 1 wherein the components of the reaction mixture are present in the following molar percentages: from about 0.1 to about 50 percent aromatic compound, from about 40 to about 90 percent amine, from about 0.01 to about two percent catalyst, from about one to about 10 percent of the inorganic acid or ammonium salt and the balance water.
7. The process of claim 1 wherein the components of the reaction mixture are present in the following molar percentages: from about one to about 10 percent aromatic compound, from about 50 to about 70 percent amine, from about 0.1 to about one percent catalyst, from about three to about six percent of the inorganic acid or ammonium salt and the balance water.
8. The process of claim 1 in which graphite electrodes are employed in the electrolysis.
9. The process of claim 1 in which the temperature of the reaction mixture is from about 0° to about 50° C.
10. The process of claim 1 in which the temperature of the reaction mixture is from about 10° to about 30° C.
11. The process of claim 1 in which the mixture being subjected to electrolysis contains benzene, ethylenediamine, BF₃, NH₄Cl and water.

References Cited
UNITED STATES PATENTS

| | | | |
|---|---|---|---|
| 3,485,726 | 12/1969 | Misono et al. | 204—59 |
| 3,488,266 | 1/1970 | French | 204—59 |
| 3,492,207 | 1/1970 | Yang et al. | 204—59 |
| 3,493,477 | 2/1970 | French et al. | 204—59 |

FREDERICK EDMUNDSON, Primary Examiner

U.S. Cl. X.R.

204—59 R; 260—667